(12) United States Patent
Arbabi et al.

(10) Patent No.: US 11,624,933 B2
(45) Date of Patent: Apr. 11, 2023

(54) ENGINEERING CHROMATIC RESPONSE USING CASCADED METASURFACES

(71) Applicant: University of Massachusetts, Boston, MA (US)

(72) Inventors: Amir Arbabi, Sunderland, MA (US); Andrew Corby McClung, Amherst, MA (US)

(73) Assignee: University of Massachusetts, Boston, MA (US)

( * ) Notice: Subject to any disclaimer, the term of this patent is extended or adjusted under 35 U.S.C. 154(b) by 379 days.

(21) Appl. No.: 16/810,313

(22) Filed: Mar. 5, 2020

(65) Prior Publication Data

US 2020/0285067 A1  Sep. 10, 2020

Related U.S. Application Data

(60) Provisional application No. 62/813,945, filed on Mar. 5, 2019.

(51) Int. Cl.
*G02B 27/42* (2006.01)
*G02B 5/18* (2006.01)
*G02B 3/00* (2006.01)

(52) U.S. Cl.
CPC ............ *G02B 27/4211* (2013.01); *G02B 3/00* (2013.01); *G02B 5/1809* (2013.01); *G02B 5/1814* (2013.01); *G02B 5/1871* (2013.01); G02B 2003/0093 (2013.01)

(58) Field of Classification Search
CPC .... G02B 27/4211; G02B 3/00; G02B 5/1809; G02B 5/1814; G02B 5/1871; G02B 2003/0093; G02B 3/08; G02B 27/0056; G02B 27/4272; G02B 26/0808
See application file for complete search history.

(56) References Cited

U.S. PATENT DOCUMENTS

2016/0299337 A1* 10/2016 Arbabi ............... G02B 27/0927
2017/0025756 A1*  1/2017 Driscoll ............. G02B 27/4233

* cited by examiner

*Primary Examiner* — Kimberly N. Kakalec
(74) *Attorney, Agent, or Firm* — Schwegman Lundberg & Woessner, P.A.

(57) ABSTRACT

To overcome the problem of a diffractive surface having a large, and often excessively large, amount of chromatic aberration, an optical system can use multiple cascaded or sequential diffractive surfaces that, combined, have a reduced amount of chromatic aberration. The optical system can be designed such that all rays traversing the optical system and passing through the diffractive surfaces have an equal optical path length. In the design process, the sets of rays are identified, and the designs of the diffractive surfaces are selected to produce the angular deviations to produce the identified ray paths. In one example, an achromatic lens formed as two annular optical surfaces can receive a collimated incident beam, redirect rays helically at the first surface toward the second surface, and redirect the rays at the second surface toward a focal point. The azimuthal redirection can decrease with increasing distance away from a central axis.

20 Claims, 11 Drawing Sheets

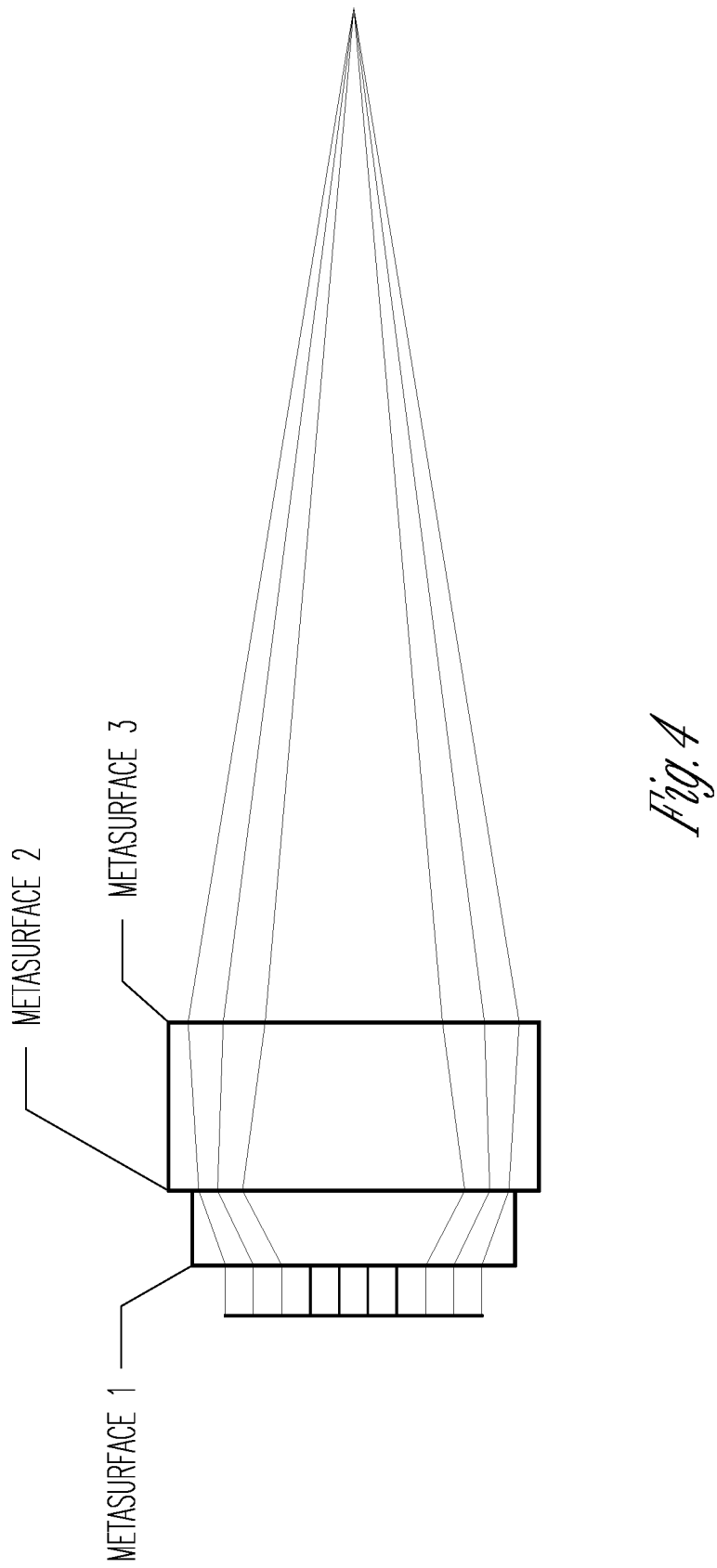

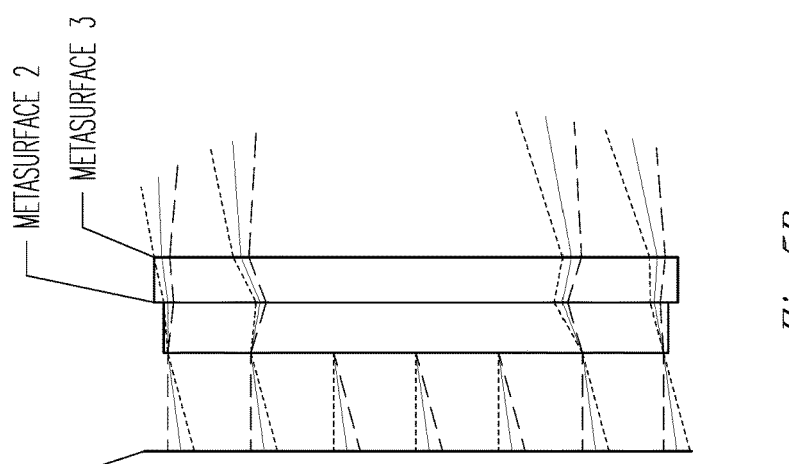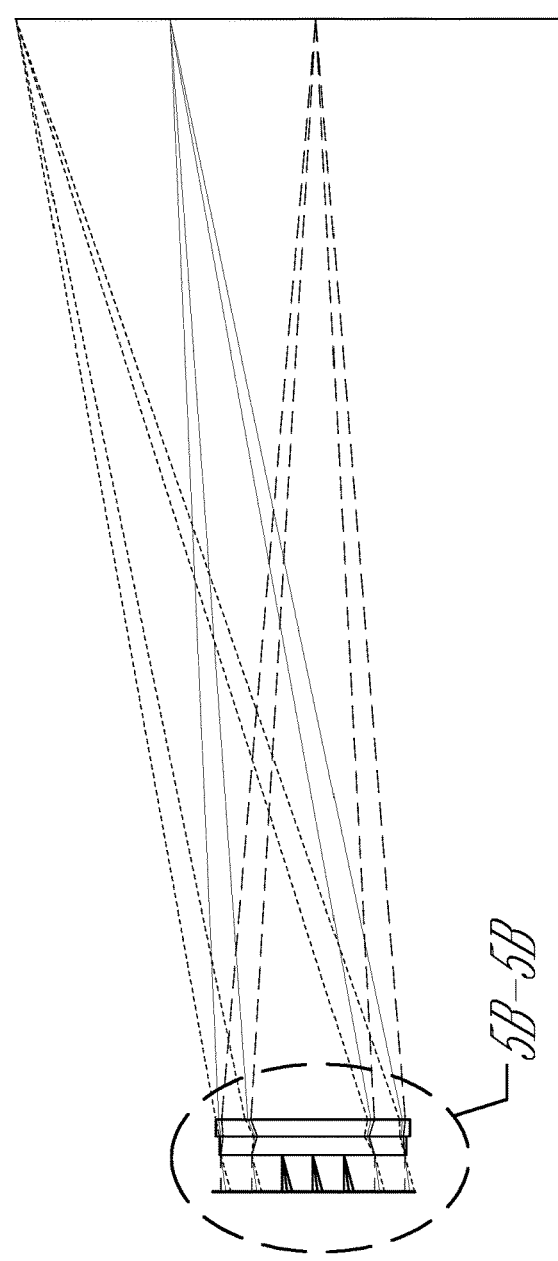
Fig. 5B
Fig. 5A

ENGINEERING CHROMATIC RESPONSE USING CASCADED METASURFACES

PRIORITY

This application claims the benefit of priority to U.S. Provisional Patent Application Ser. No. 62/813,945, filed Mar. 5, 2019, which is incorporated herein by reference in its entirety.

GOVERNMENT LICENSE RIGHTS

This invention was made with government support under Grant No. S385617 awarded by the Defense Advanced Research Projects Agency. The government has certain rights in the invention.

FIELD OF THE DISCLOSURE

The present disclosure relates to an optical device.

BACKGROUND OF THE DISCLOSURE

Diffractive surfaces typically have high levels of chromatic aberration. For example, for a diffractive surface designed to receive an incident ray and produce an exiting ray, the exiting ray may vary in position and/or propagation angle, as a function of wavelength of the light that forms the incident ray. Such high levels of chromatic aberration can limit the applications that use of diffractive surfaces.

BRIEF DESCRIPTION OF THE DRAWINGS

FIG. 2A shows an example of a schematic of an achromatic bilayer metasurface beam deflector, FIG. 2B shows phase profiles of the metasurfaces composing the beam deflector shown in FIG. 2A. FIG. 2C shows an example of wavelength dependence of the deflection angle for the achromatic bilayer and a single layer metasurface beam deflectors. FIG. 2D shows an example of a twisted achromatic bilayer metalens. FIG. 2E radial portions of the phase profiles of the two metasurfaces of the metalens shown in FIG. 2D. FIG. 2F shows an example of wavelength dependence of the focal lengths of the bilayer metalens shown in FIG. 2E and a single layer metalens. FIG. 2G shows an example of axial (left) and focal (right) plane intensity distributions for the bilayer metalens. FIG. 2H shows an example of axial and focal plane intensity distribution for the single layer metalens at three different wavelengths.

FIG. 4 shows an example of a Type I triplet chromatic corrector combined with a focusing metasurface to form a wideband triplet metalens.

FIGS. 5A and 5B show an example of a Type II triplet chromatic corrector combined with a focusing metasurface. FIG. 5A shows Type II triplet chromatic corrector combined with a focusing metasurface to form a wideband triplet metalens with a large field of view. The last surface of the Type II triplet corrector and the focusing metasurface have been combined and have formed metasurface 3. FIG. 5B shows an expanded view of the ray trajectories through the triplet.

FIG. 6A shows an example of a single layer metasurface with regular dispersion $d\theta/d\lambda = \tan(\theta)/\lambda$, where $\theta$ is the deflection angle and $\lambda$ is the wavelength. FIG. 6B shows an example of an achromatic beam deflector $d\theta/d\lambda=0$. FIG. 6C shows an example of a super-dispersive beam deflector $d\theta/d\lambda > \tan(\theta)/\lambda$. FIG. 6D shows an example of a beam deflector with positive dispersion $d\theta/d\lambda < 0$.

FIG. 7A shows an example of an afocal triplet that increases the chromatic dispersion of a metalens when cascaded with a metalens. FIG. 7B shows an example of an afocal triplet with an annular aperture that changes the sign of chromatic dispersion of a metalens when cascaded with a metalens.

FIG. 8A shows an example of a Type I corrector. FIG. 8B shows an example of a Type II corrector.

Corresponding reference characters indicate corresponding parts throughout the several views. Elements in the drawings are not necessarily drawn to scale. The configurations shown in the drawings are merely examples and should not be construed as limiting the scope of the disclosure in any manner.

DETAILED DESCRIPTION

Figure 1A:
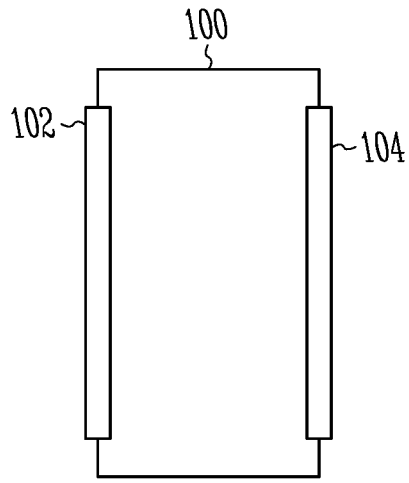
FIGS. 1A-1C illustrate examples of an optical element and light rays passing through the optical element.

Described herein is a condition for achieving achromatic optical systems composed of cascaded metasurfaces. Applications of such a system may use, for example, achromatic beam deflectors, multilayer metalenses with annular apertures that exploit the orbital angular momentum of light, and metalenses with large field of view. The disclosed approach can be also used to increase, decrease, or change the sign of chromatic response and the dispersion of optical and electromagnetic devices.

Metasurfaces are 2D arrays of scatterers (or meta-atoms) that shape the wavefront, polarization, or amplitude distributions of light with subwavelength resolution. They are manufactured using semiconductor microfabrication techniques and may be designed to replace conventional optical elements or offer novel functionality.

Recent progress has led to high efficiency metasurfaces, enabling cascaded metasurface systems. However, as with other diffractive elements, metasurfaces suffer from significant chromatic aberrations, limiting them to narrowband applications. Traditional approaches to correct chromatic aberrations, such as pairing elements with positive and negative optical powers, have proven ineffective in focusing systems made of only diffractive elements. Consequently, achromatic systems with metasurfaces have been limited to diffractive-refractive hybrids or small metasurfaces that exploit meta-atom dispersion.

In an example, an optical element may comprise at least one body that is substantially transparent at a wavelength. The at least one body having a first optical surface, the first optical surface including a first pattern formed from first sub-wavelength elements that are sized smaller than the wavelength. The at least one body may also include a second optical surface opposite and substantially parallel to the first optical surface, the second optical surface including a second pattern formed from second sub-wavelength elements that are sized smaller than the wavelength.

In an example, the first pattern and the second pattern may be configured such that the at least one body can function as an achromatic beam deflector. The first pattern and the second pattern may be further configured such that the at least one body can function as an achromatic doublet metalens. In an example, the first pattern and second pattern may be configured such that the at least one body can function as a triplet chromatic corrector.

In an example, the first pattern and the second pattern may be configured such that the at least one body can function as a triplet metalens. In an example, the first pattern and the second pattern may be configured such that the at least one body is can function as a triplet corrector, the triplet corrector may be a Type I corrector or a Type II corrector. In an example, the first pattern and the second pattern may be configured such that the at least one body can function as a metalens triplet based on a corrector, the corrector may be a Type I corrector or a Type II corrector.

In an example, the first pattern and the second pattern may be configured such that the at least one body can function as a super-dispersive beam deflector. In an example, the first pattern and the second pattern may be configured such that the at least one body can function as a beam deflector having positive dispersion. In an example, the first pattern and the second pattern are configured such that the at least one body is configured to function as an afocal triplet. In an example, the optical element may further comprise of a triplet lens, wherein the first pattern and the second pattern may be configured such that the at least one body can function as an afocal triplet that may increase a dispersion of the triplet lens or change the sign of a dispersion of the triplet lens.

In an example, the first and second optical surfaces may be planar, and the incident beam may be configured to strike the incident surface at normal incidence. The incident beam, the internal beam, and the exiting beam may have respective central axes that are co-planar in a first plane that is orthogonal to the incident and exiting surfaces.

In an example, a first ray in the internal beam may strike the exiting surface at a first location and emerge from the exiting surface from the first location. The first location may define a second plane to be orthogonal to the first plane, to be orthogonal to the exiting surface, and to extend through the first location. The first ray in the internal beam and the first ray in the exiting beam may be on a same side of the second plane. The first (incident) surface and the second (exiting) surface may be formed as opposing faces of a transparent optical body.

In an example, an achromatic lens may include a first optical surface including a first pattern formed from sub-wavelength elements, the first pattern extending over a first annular area that surrounds a first central location. The first pattern may be configured to receive an incident beam, the incident beam including light rays that are all parallel to one another. The first optical surface may be further configured to angularly divert each light ray in the incident beam by a first angular diversion to form a helical internal beam. The first angular diversion varying from ray-to-ray for at least two light rays in the incident beam.

The achromatic lens may also include a second optical surface which may be oriented parallel to the first optical surface. The second optical surface may include a second pattern formed from sub-wavelength elements, the second patter extending over a second annular area that surrounds a second central location. The first and second central locations may define a central axis. The second pattern may be configured to receive the helical internal beam and angularly divert each light ray in the helical internal beam by a second angular diversion to form an exiting beam. The second angular diversion may vary from ray-to-ray for at least two light rays in the helical internal beam such that all the light rays in the exiting beam are angled to intersect the central axis at a focal point of the achromatic lens.

In an example, the first and second optical surfaces may be planar, and the light rays in the incident beam may be orthogonal to the first optical surface. A first light ray may be configured to strike the first pattern at a first location that is separated from the central axis by a first distance, and the first pattern may be configured to angularly divert the first ray to strike the second pattern at a second location that is separated from the central axis by the first distance. The first and second locations may be separated from the central axis by a first azimuthal angle. The first (incident) surface and the second (exiting) surface may be formed as opposing faces of a transparent optical body.

In an example, a second ray may be configured to strike the first pattern at a third location that is separated from the central axis by a second distance that is different from the first distance. The first pattern may be configured to angularly divert the second ray to strike the second pattern at a fourth location that is separated from the central axis by a second distance. The third and fourth locations may be separated by a second azimuthal angle that is different from the first azimuthal angle. The second distance may be less than the first distance and the second azimuthal angle may be greater than the first azimuthal angle.

Figure 1B:
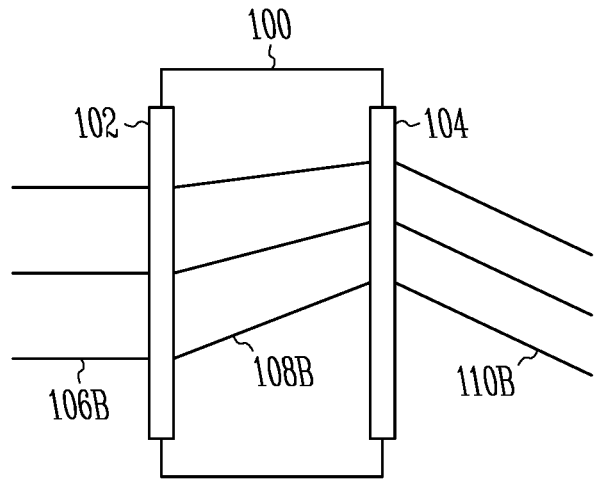
Figure 1C:
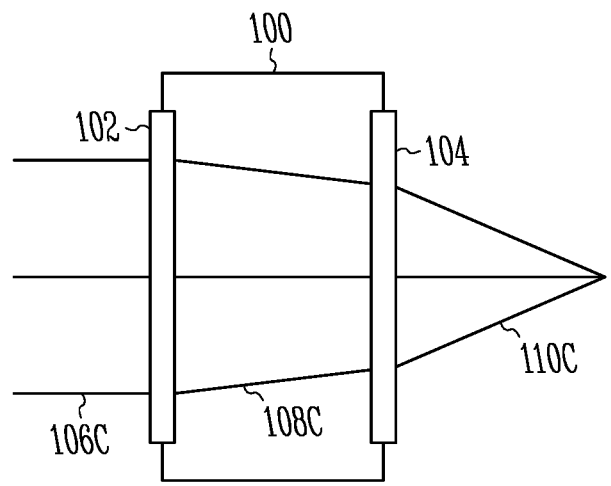

FIGS. 1A-1C illustrate examples of an optical element and light rays passing through the optical element. In an example, an optical element comprising a body 100 which may include a first optical surface 102 and a second optical surface 104. In an example, the first optical surface 102 and the second optical surface 104 may be planar. In an example, the second optical surface 104 may be substantially parallel to the first optical surface 102. The body 100 may be substantially transparent at a wavelength. The first optical surface 102 may include a first pattern formed from first sub-wavelength elements that are sized smaller than the wavelength. Similarly, the second optical surface 104 may include a second pattern formed from second sub-wavelength elements that are sized smaller than the wavelength.

In an example, an incident beam 106B and 106C may strike the first optical surface 102 which may be an incident surface, at a normal incidence. As the incident beam 106B and 106C passes through the first optical surface 102, the first pattern may cause the incident beam 106B and 106C to be deflected at a first angle in an area (e.g., a space, a distance, or the like) between the first optical surface 102 and the second optical surface 104. The internal beam 108B and 108C may strike the second optical surface 104 which may be an exiting surface. The second pattern in the second optical surface 104 may cause the internal beam 108B and 108C to exit the second optical surface 104 at a second angle, as an exiting beam 110A and 110B.

Figure 2A:
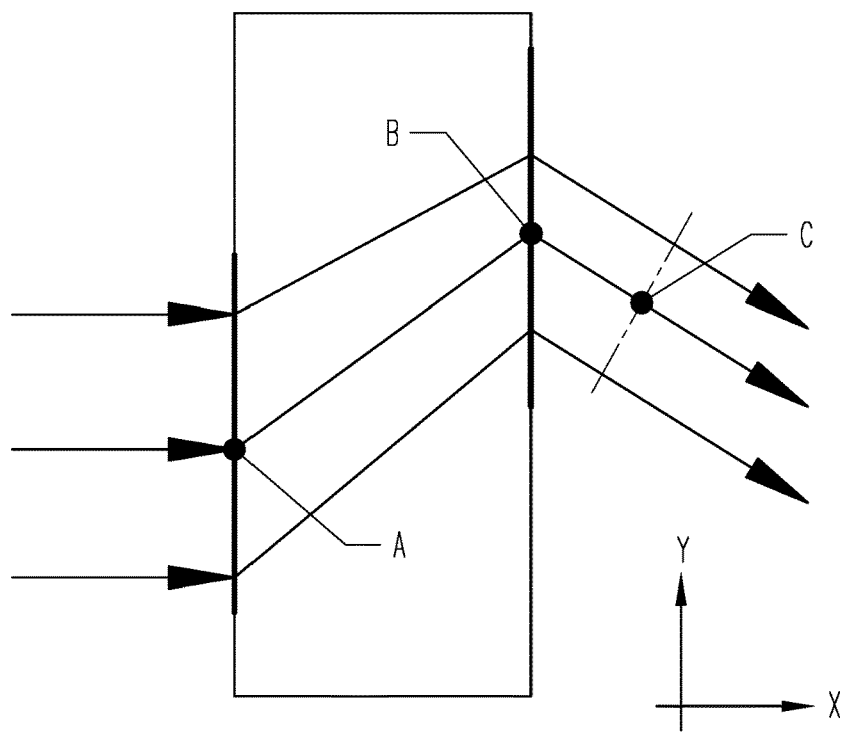
FIGS. 2A-2H show examples of an achromatic bilayer metasurface beam deflector.
Figure 2B:
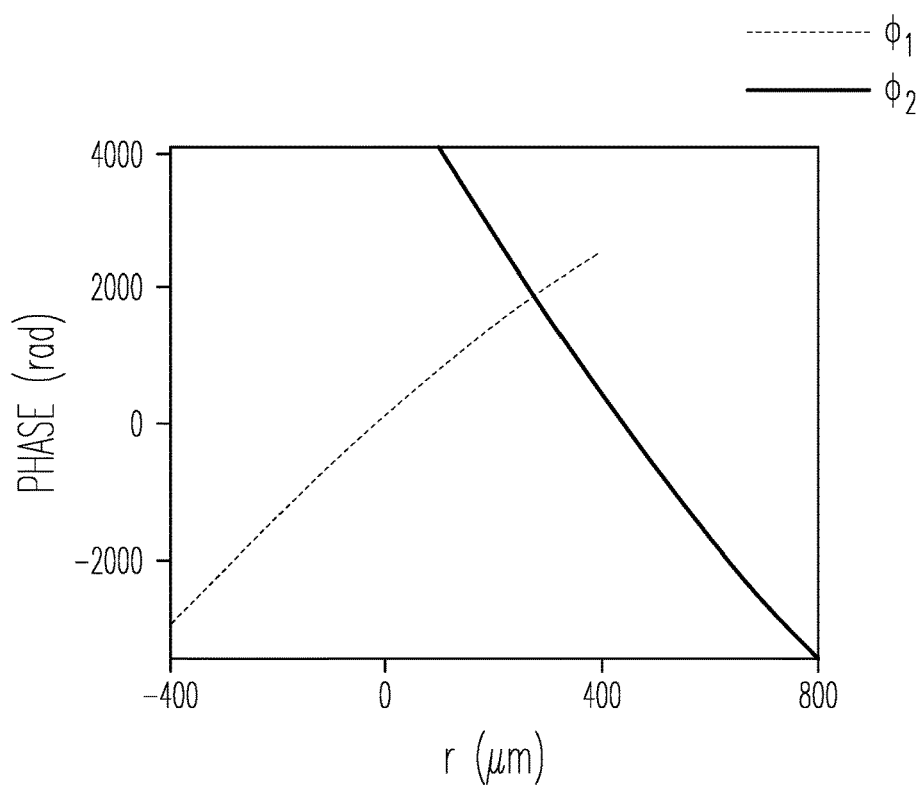
Figure 2C:
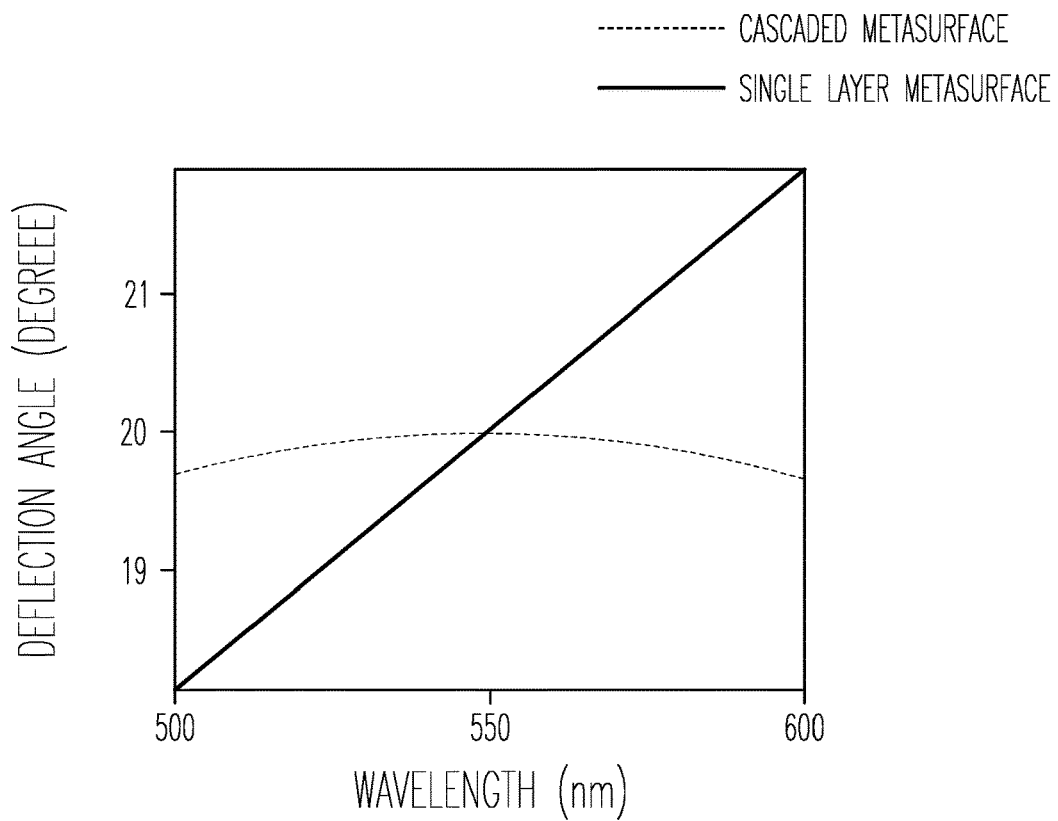
Figure 2D:
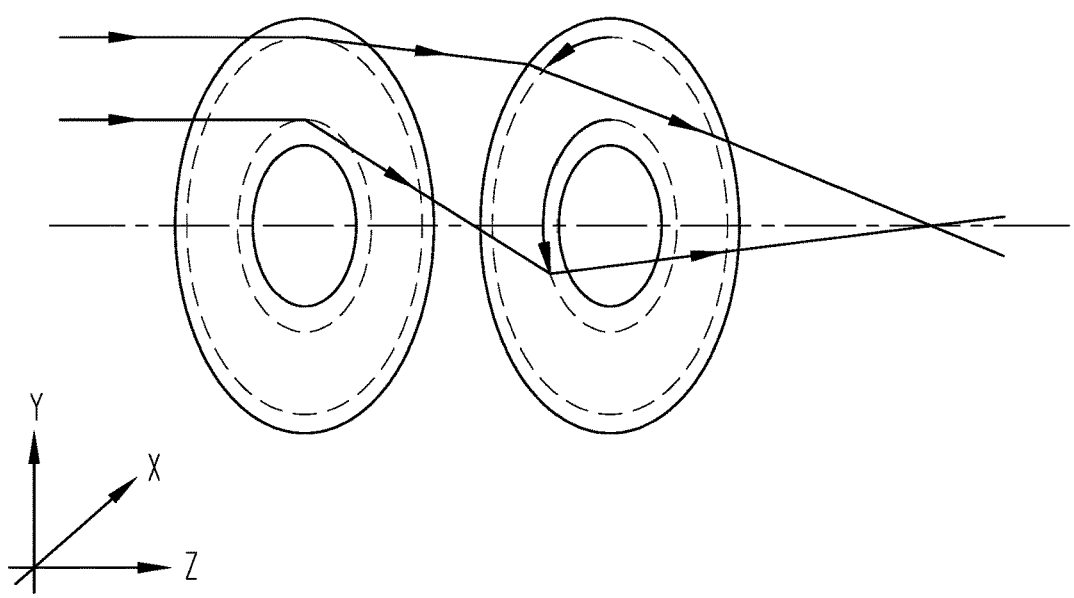
Figure 2E:
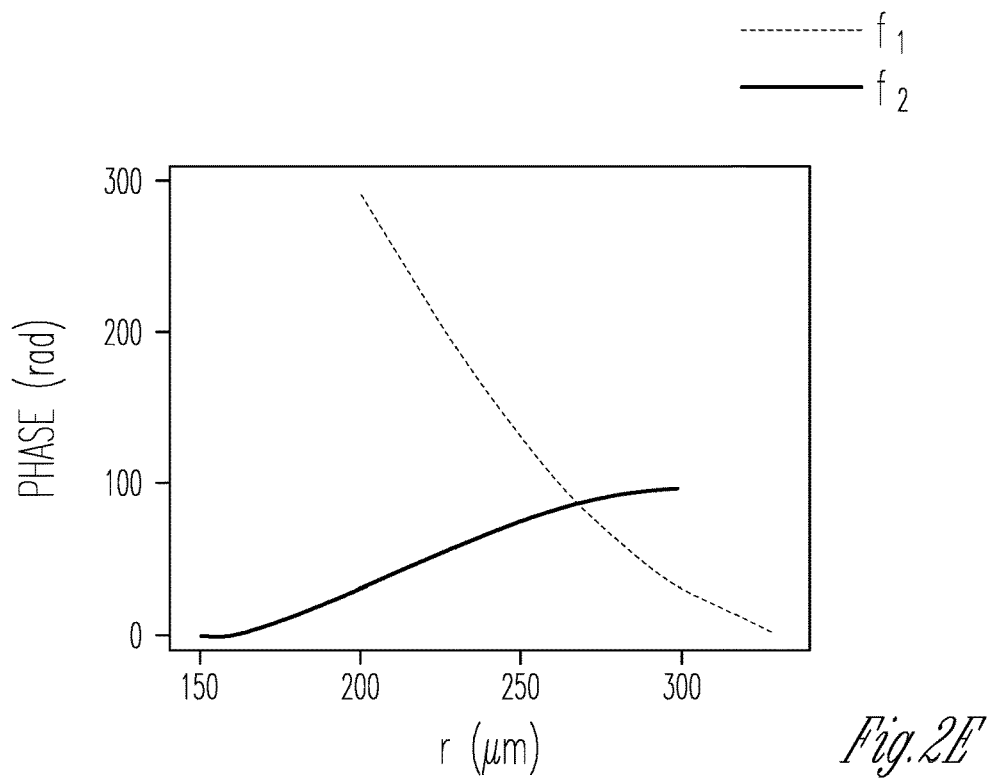
Figure 2F:
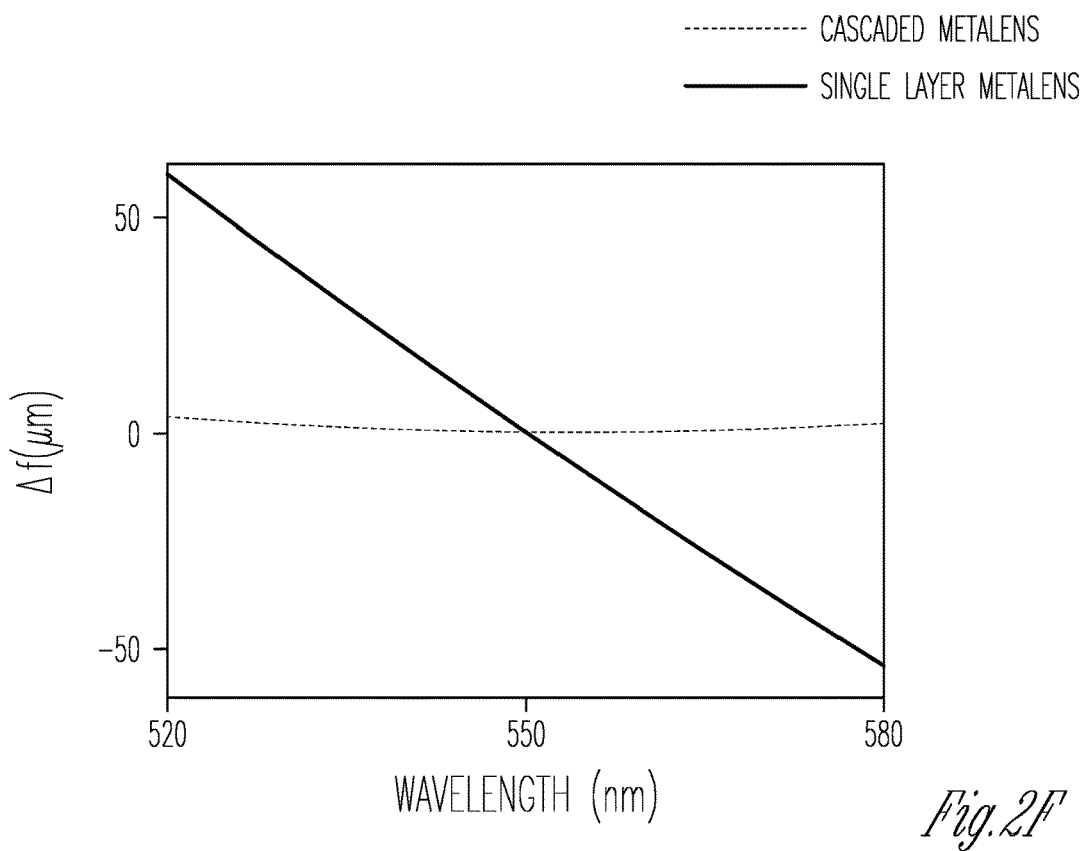
Figure 2G:
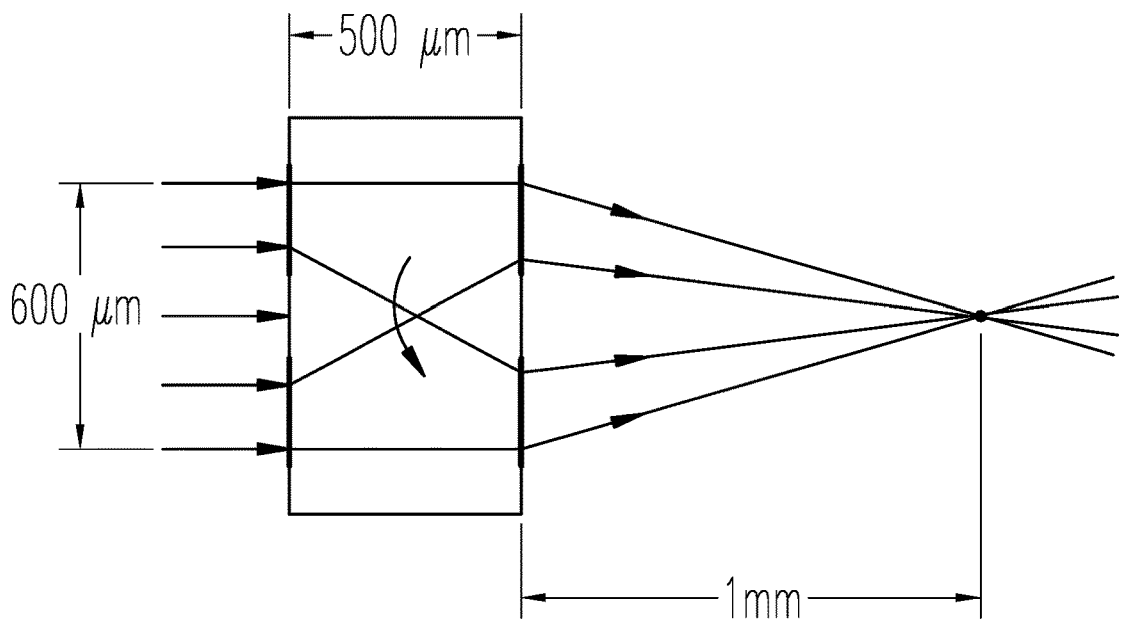
Figure 2H:
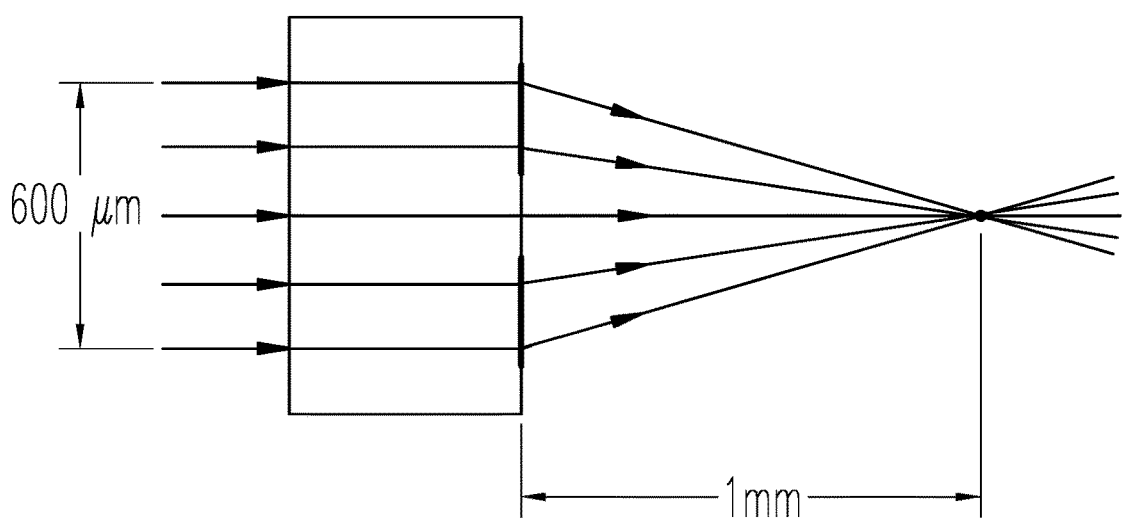

FIGS. 2A-2H show examples of an achromatic bilayer metasurface beam deflector. FIG. 2A shows an example of a schematic of an achromatic bilayer metasurface beam deflector. FIG. 2B shows phase profiles of the metasurfaces composing the beam deflector shown in FIG. 2A. FIG. 2C shows an example of wavelength dependence of the deflection angle for the achromatic bilayer and a single layer metasurface beam deflectors. FIG. 2D shows an example of a twisted achromatic bilayer metalens. FIG. 2E shows radial portions of the phase profiles of the two metasurfaces of the metalens shown in FIG. 2D. FIG. 2F shows an example of wavelength dependence of the focal lengths of the bilayer metalens shown in FIG. 2E and a single layer metalens. FIG. 2G shows an example of axial (left) and focal (right) plane intensity distributions for the bilayer metalens. FIG. 2H shows an example of axial and focal plane intensity distribution for the single layer metalens at three different wavelengths.

Figure 3:
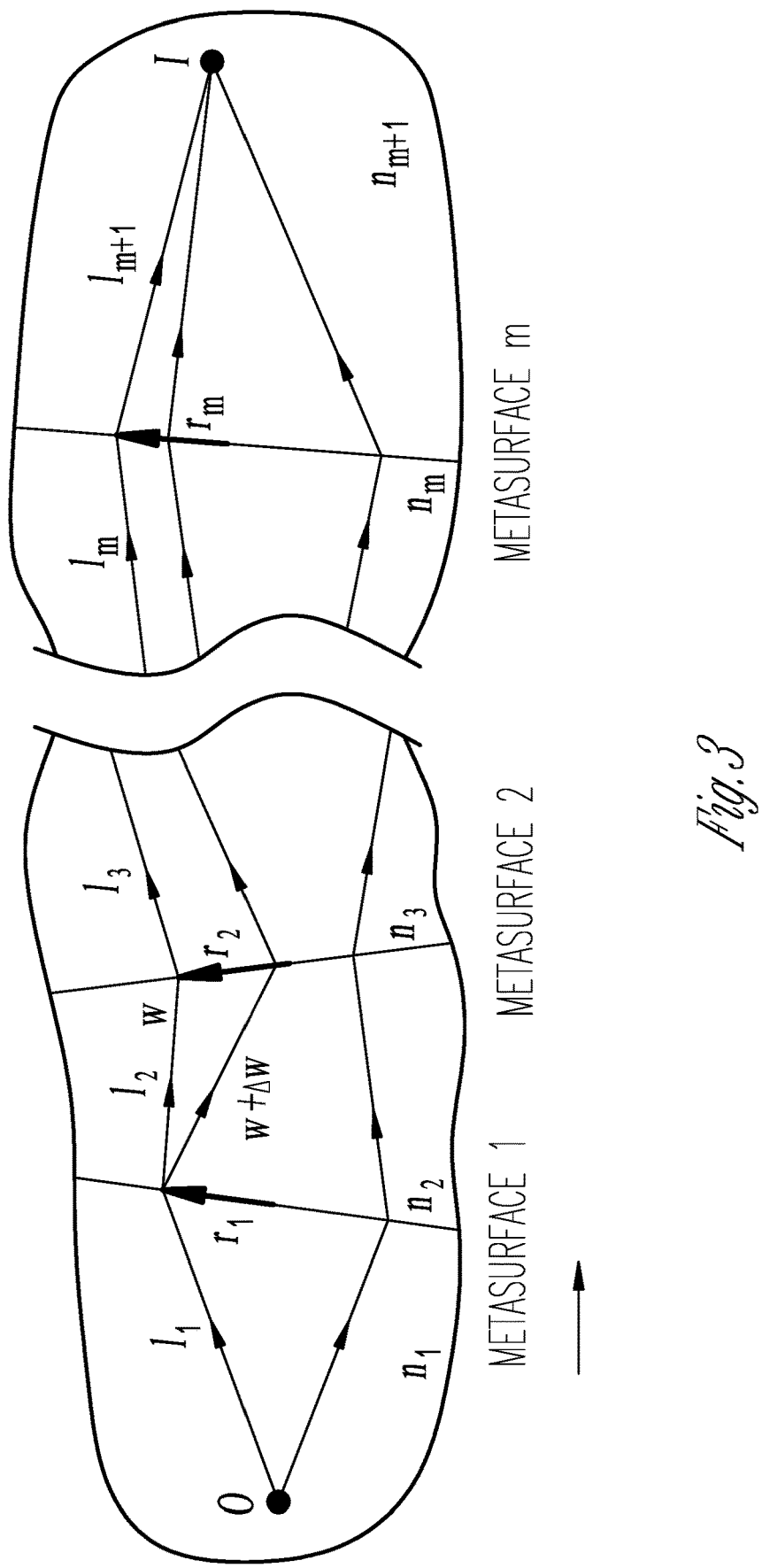
FIG. 3 shows an example of focusing by a cascaded metasurface system.

Gradient metasurfaces can be considered beam deflectors with spatially varying deflection angle. A single layer non-dispersive metasurface beam deflector that deflects normally incident light by an angle θ may exhibit grating dispersion dθ/dλ=tan(θ)/λ. As shown in FIG. 2A, a metasurface beam deflector can be realized using two parallel non-dispersive metasurfaces by choosing points O and I (as shown and described for FIG. 3 below) a distance from the metasurfaces along the normal direction and at an angle θ with respect to the normal direction, respectively. To achieve achromatic beam deflection (e.g., dθ/dλ=0), the two metasurfaces may be designed such that OGL (as described in FIG. 3 below) from O to I (as shown in FIG. 3 below), $l_g$ (as defined in FIG. 3 below)=$n_g l_{AB}+l_{BC}$ are the same for all ray paths (where $n_g$ is a group index of the material separating the metasurfaces). For any point A on the first metasurface and fixed $l_g$, a point B on the second metasurface and deflection angles at both metasurfaces can be determined. Using the deflection angles and the grating equation, the phase profiles can be obtained. FIG. 2B shows the phase profiles for a 20° bilayer metasurface beam deflector (FIG. 2A) produced by this procedure.

According to an equal OGL (as explained in FIG. 3 below) condition, when all the metasurfaces have paraxial regions then a set of cascaded parallel metasurfaces cannot be achromatic because the axial ray has the minimum OGL. However, an achromatic cascaded metalens with an annular aperture can be realized when metasurfaces are designed to deflect rays along paths of equal OGL. FIG. 2E shows an example of a bilayer metalens that achieves equal OGL by deflecting the rays by different angles along the azimuthal direction. Incident rays closer to the optical axis can be deflected by larger azimuthal angles by the first metasurface to compensate for the shorter length they travel between the second metasurface and the focal point I. For example, circularly symmetric bilayer metalens with an annular aperture (150 μm<$r_1$<300 μm), selecting $\phi_1=N\theta+f_1(r)$ and $\phi_2=-N\theta+f_2(r)+\omega/c\sqrt{r^2+f^2}$ for the two metasurfaces that are separated by a 500 μm-thick-substrate with refractive index of 1.46 may be utilized. N=750 and focal length of f=1 mm, and $f_1(r)$ and $f_2(r)$ may be obtained by setting $l_g$=1785 μm for all ray paths (as shown in FIG. 2F). The first metasurface may twist the incident beam generating a helical beam with large (N=750) orbital angular momentum and the second metasurface may remove the wavefront's helicity and focus the beam to point I. Simulated focal length for the bilayer twisted metalens (FIG. 2E) and a single layer metalens and their corresponding cross sectional and focal plane intensity distributions are shown in FIGS. 2G-2I.

The constant OGL condition may be applied to structures with more than two metasurface layers, which may allow for correction of other off-axis aberrations. The constant OGL condition may be also be applied to achromatic optical systems composed of refractive and diffractive components, thus enabling a new class of optical components and systems as discussed below for FIG. 4.

FIG. 3 shows an example of an illustration of focusing by a cascaded metasurface system. In an example, the system may be configured to bring a set of rays at angular frequency ω originating at an object point O into focus at an image point I (as shown in FIG. 3). The system may include a ray and let $r_m$ represent the 2D position vector in the plane of the $m^{th}$ metasurface for the intersection point of the ray and the metasurface (as shown in FIG. 3). When the light frequency is changed to ω+Δω, each metasurface can deflect the ray by a different angle, altering its trajectory. In an example, the ray may still pass through I despite taking a different path. The cascaded metasurface system can be defined as 'achromatic' if this happens over a continuous frequency range near w and to the first order approximation in Δω.

The phase accumulated by the ray is given by $$\Phi(\omega, r_1, r_2, \ldots, r_M) = \sum_{m=1}^{M+1} \frac{\omega}{c} n_m l_m + \sum_{m=1}^{M} \phi_m(\omega, r_m) \quad (1)$$

where c is the speed of light in vacuum, $l_m$ the path length between metasurfaces m−1 and m inside a material with refractive index $n_m$, and $\phi_m$ the phase imparted by the $m^{th}$ metasurface.

According to Fermat's principle, the total phase acquired is stationary with respect to path variations, thus $$\nabla_m \Phi = 0, \, m=1,2 \ldots, M \quad (2)$$

where $\nabla_m$ represents the gradient with respect to $r_m$. Furthermore, Φ is the same for all rays focused to I. When the frequency of the ray is changed to ω+Δω, intersection of the ray with the $m^{th}$ metasurface is $r_m+\Delta r_m$, where $\Delta r_m=dr_m/d\omega \Delta\omega$. To first order in Δω, the accumulated phase changes by $$\Delta\Phi = \left(\frac{\partial\Phi}{\partial\omega} + \sum_{m=1}^{M} \nabla_m \Phi \cdot \frac{dr_m}{d\omega}\right)\Delta\omega = \frac{\partial\Phi}{\partial\omega}\Delta\omega, \quad (3)$$

where the second term in parentheses vanishes according to Eqn. (2). At ω+Δω the system may focus rays to point I when the phase accumulated along each ray's path (Q+A) is the same. Because C is the same for each ray, the cascaded metasurface structure is achromatic when ΔΦ or equivalently $l_g \triangleq c\Delta\Phi/\Delta\omega$ is the same for all the rays. From Eqn. (3) we have $$l_g = c\frac{\partial\Phi}{\partial\omega} = \sum_{m=1}^{M+1} n_{mg} l_m + \sum_{m=1}^{M} c\phi'_m \quad (4)$$

where $n_{mg}=d(\omega n_m)/d\omega$ represents the group index for the $m^{th}$ material and $\phi_m'=\partial\phi_m/\partial\omega$. The travel time for a narrow-band pulse along the ray is the group delay $\tau_g=\Delta\Phi/\Delta\omega$, hence $l_g=c\tau_g$ can be defined as the optical group length (OGL). Therefore, the cascaded metasurface structure is achromatic when OGL for all the ray paths are equal.

In an example, a ray may be at an angular frequency, ω. The first metasurface may lie on a first axis, $x_1$ and may deflect a normally-incident ray to an angle $\theta_1$. The second metasurface may lie on a second axis, $x_2$, parallel to and a distance d from $x_1$. The second metasurface may deflect the ray to an angle $\theta_2$. $\theta_2$ may be a deflection angle for the beam deflector and can be the same for all rays at frequency ω, while $\theta_1$ may vary among rays. Angle $\theta_2$ may be formed by a third axis, u, and the $x_1$ axis. The origin of each axis may form at an intersection point of the axes.

There may be a first medium between the $x_1$ and $x_2$ axes with a refractive index $n_2$. Similarly, there may be a second medium to the right of $x_2$ with a refractive index $n_3$. At the frequency, ω, a total phase accumulated from $x_1$ to u may be constant for all rays. The total phase accumulated from $x_1$ to u may be constant for all rays. A group length for the ray may be express as:

$$l_g(u) = \frac{n_2 d}{\cos\theta_1} + n_3 u \tan\theta_2 \quad (5)$$

For a fixed u and $\theta_2$ there can be two values of $\theta_1 \in |-\pi, \pi$ that satisfy Eqn. 5. When the requirement that $l_g(u)=au+l_0$ the phase change along with u can be rewritten, due to a frequency change $\Delta\omega$ as:

$$\Delta\Phi(u) = \frac{\Delta\omega}{c}(au + l_0) \quad (6)$$

A phase profile for a plane wave arriving at u at an oblique incidence may be expressed as:

$$\Delta\Phi(u) = \Phi_0 - \frac{n_3\omega}{c} u \sin\Delta\theta \quad (7)$$

Where $\Delta\theta$ represents the angle of the wavefront with respect to u. Equating first-order coefficients in Eqns. 6 and 7 gives:

$$\frac{\Delta\theta}{\Delta\omega} = -\frac{a}{n_3\omega} \quad (8)$$

Here, $\sin\Delta\theta \approx \Delta\theta$ and $a=\tan\theta_2$, which may give an ordinary grating dispersion. The achromatic condition may arise when a=0. When these bounds are exceeded super-dispersive and positive behavior may result.

For a given value of $l_0$, Eqn. 5 may be solved for $\theta_1(u)$ with $x_1$, $x_2$, and u related by:

$$x_2 = \frac{u}{\cos\theta_2} \quad (9)$$

and $$x_1 = x_2 - d\tan\theta_1 \quad (10)$$

Using the equations above, phase surfaces may be designed to produce desired deflections at $x_1$ and $x_2$.

FIG. 4. shows an example of a Type I triplet chromatic corrector (as described in FIG. 8 below) combined with a focusing metasurface to form a wideband triplet metalens. In an example, (Type I), a first metasurface (metasurface 1) can deflect normally incident rays away from the optical axis, the second metasurface (metasurface 2) can deflect the rays toward the optical axis, and the third metasurface (metasurface 3) can deflect the rays such that they become parallel to the optical axis.

In an example, a surface (e.g., a last surface) of the Type I triplet corrector and the focusing metasurface can be combined to form metasurface 3. The triplet metalens may present ray trajectories at multiple wavelengths (e.g., ranging from 700 nm to 1000 nm). The two types of afocal triplet correctors shown in FIG. 8A below can be cascaded with a single layer metasurface lens (e.g., a 'focuser') to form wideband lenses. Returning to FIG. 4, a Type I corrector may be cascaded with a single layer metalens and the last surface of the corrector and the metalens can be combined to form metasurface 3.

FIGS. 5A and 5B show an example of a Type II triplet chromatic corrector (as described in FIG. 8B below) combined with a focusing metasurface. In an example shown in FIG. 5A, a Type II triplet chromatic corrector may be combined with a focusing metasurface to form a wideband triplet metalens with a large field of view. The last surface of the Type II triplet corrector and the focusing metasurface may be combined and to form metasurface 3. FIG. 5B shows an expanded view of the ray trajectories through the triplet. In an example, a surface (e.g., a last surface) of the Type II triplet corrector and a focusing metasurface can be combined to form metasurface 3. The triplet metalens may present ray trajectories at wavelengths ranging from 800 nm to 900 nm for different incident angles. For example, an achromatic metalens triplet can be obtained by cascading a Type II triplet corrector with a single layer metalens. The Type II corrector can deflect normally incident rays toward the optical axis, the second metasurface (metasurface 2) can deflect the rays away from the optical axis, and the third metasurface (metasurface 3) can deflect the rays such that they become parallel to the optical axis.

Figure 6D:
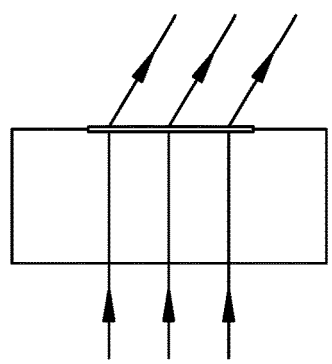
FIGS. 6A-6D show examples of beam dispersion/deflection patterns through metasurfaces.
Figure 6C:
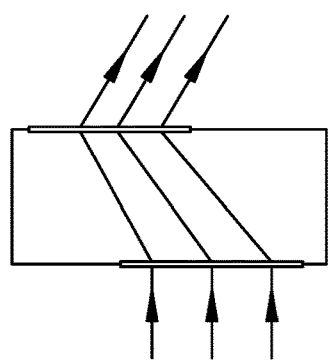
Figure 6B:
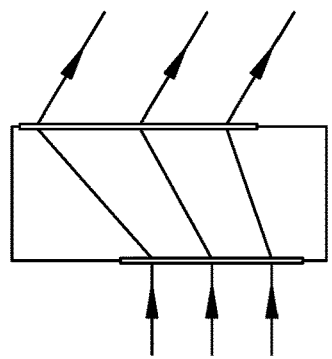
Figure 6A:
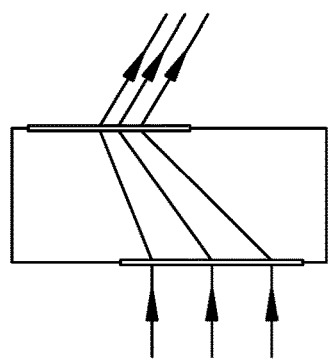

FIGS. 6A-6D show examples of beam dispersion/deflection patterns through metasurfaces. The differences among the OGL for different rays may lead to the chromatic dispersion of metasurface devices. Therefore, chromatic dispersion can be increased by increasing the difference among the OGL of different rays. Bilayer beam deflectors may achieve different dispersions. For example, FIG. 6A illustrates an example of a single layer metasurface with regular dispersion $d\theta/d\lambda=\tan(\theta)/\lambda$, where $\theta$ is the deflection angle and $\lambda$ is the wavelength. FIG. 6B illustrates an example of an achromatic beam deflector where $d\theta/d\lambda=0$.

FIG. 6C illustrates an example of a super-dispersive beam deflector where $d\theta/d\lambda>\tan(\theta)/\lambda$. In the example of FIG. 6C an increased dispersion may be achieved by deflecting the rays incident on a top portion of the input aperture by larger angles as compared to the rays incident on a lower portion of the aperture. FIG. 6D illustrates an example of a beam deflector with positive dispersion where $d\theta/d\lambda<0$. This may be caused by overcorrecting the dispersion in the achromatic beam deflector.

Figure 7A:
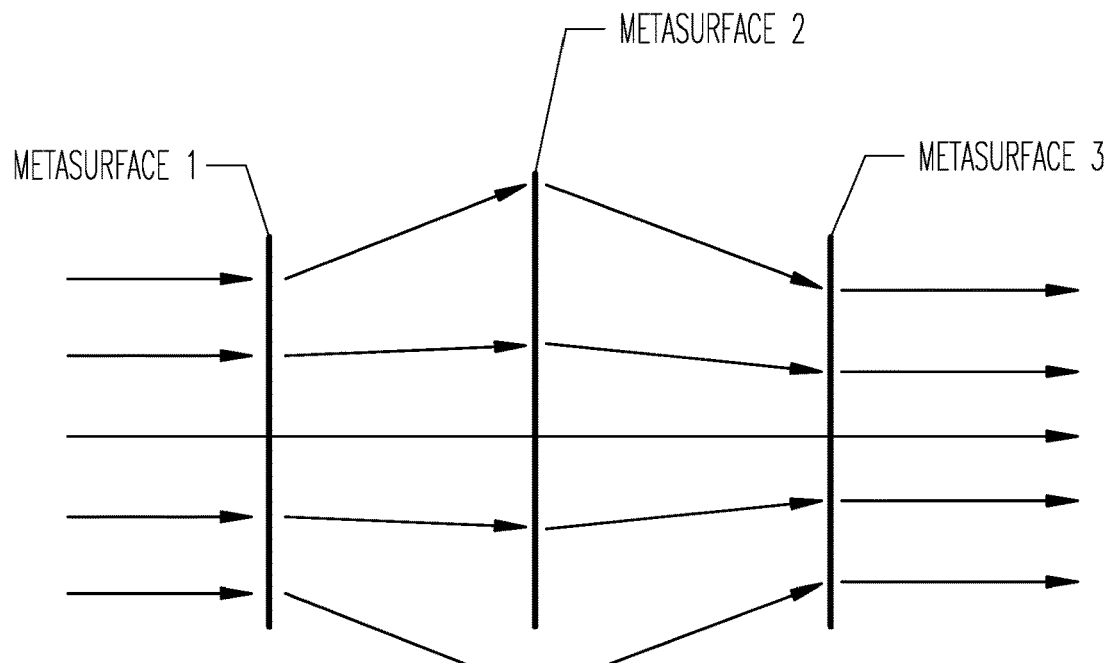
FIGS. 7A and 7B show examples of an afocal triplet.
Figure 7B:
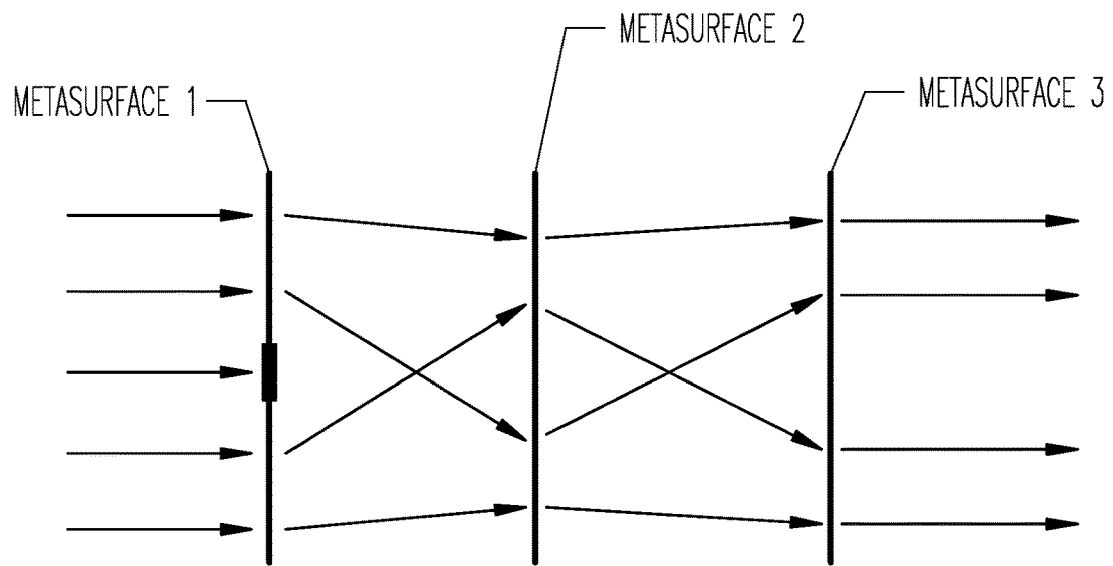

FIGS. 7A and 7B shows examples of an afocal triplet. FIG. 7A illustrates an afocal triplet that may increase the chromatic dispersion of a metalens when cascaded with a metalens. FIG. 7B illustrates an afocal triplet with an annular aperture that may change the sign of chromatic dispersion of a metalens when cascaded with a metalens. In an example, an afocal triplet may overcorrect its chromatic dispersion, (as shown in FIG. 7B) that can achieve metalenses with positive dispersion (e.g., $df/d\lambda>0$).

Figure 8A:
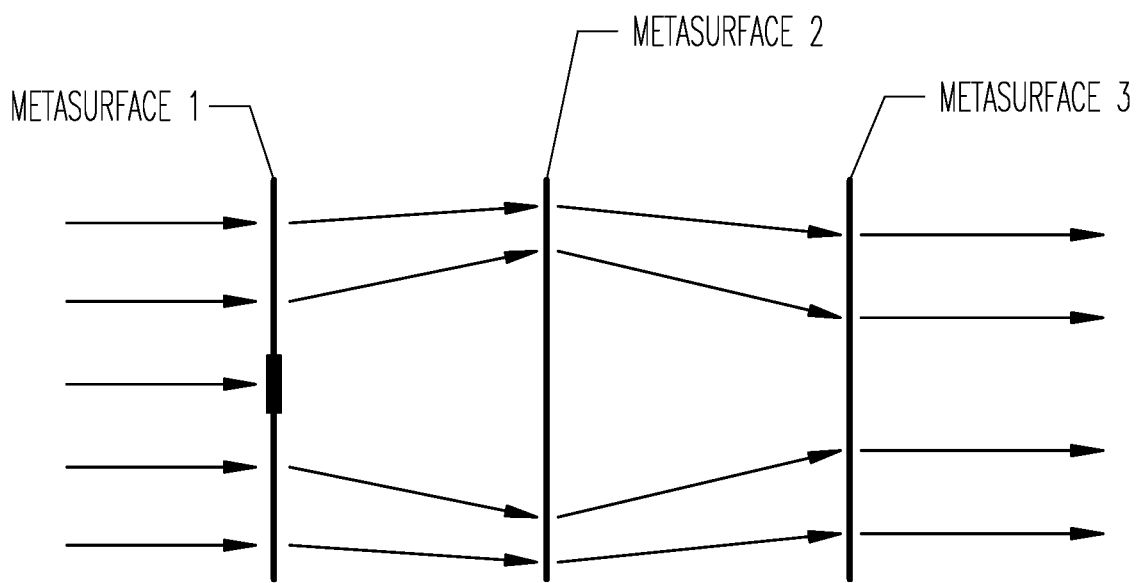
FIGS. 8A and 8B show examples of two types of triplet chromatic correctors with annular apertures.
Figure 8B:
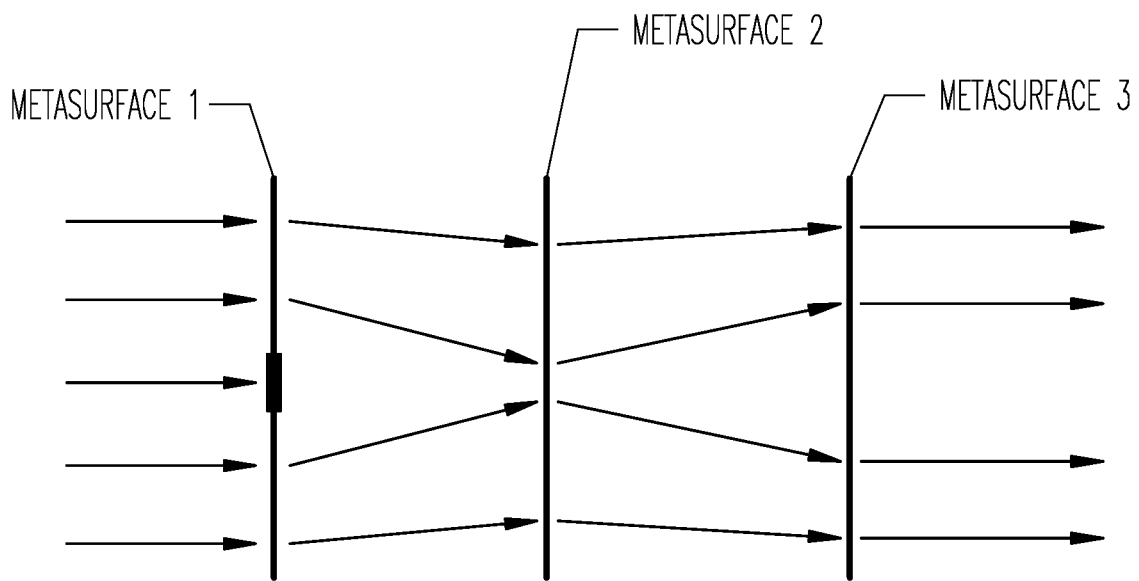

FIGS. 8A and 8B show examples of a triplet chromatic corrector with annular apertures. FIG. 8A shows an example of a Type I corrector. FIG. 8B shows an example of a Type II corrector. In an example of a Type I corrector, the first metasurface (metasurface 1) can deflect normally incident rays away from the optical axis, the second metasurface (metasurface 2) can deflect the rays toward the optical axis, and the third metasurface (metasurface 3) can deflect the rays such that they become parallel to the optical axis.

In an example of the Type II corrector, the first metasurface (metasurface 1) can deflect normally incident rays toward the optical axis, the second metasurface (metasurface 2) deflects the rays away from the optical axis, and the third metasurface (metasurface 3) deflects the rays such that they become parallel to the optical axis.

In an example, circularly symmetric trilayer metasurfaces (as shown in FIGS. 8A and 8B) can be used as correctors for chromatic aberrations. Both Type I and Type II may be afocal at their design wavelengths and have annular apertures. Each corrector can deflect the rays closer to the optical axis by larger angles. Therefore, the rays closer to the optical axis have larger OGL. As a result, such correctors can be cascaded with metasurface lenses that have smaller OGL for rays closer to the optical axis to form achromatic focusing systems.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An achromatic bilayer metasurface beam deflector, comprising:
   at least one body that is substantially transparent at a wavelength,
   the at least one body having a first optical surface,
   the first optical surface including a first pattern formed from first sub-wavelength elements that are sized smaller than the wavelength,
   the at least one body having a second optical surface opposite and substantially parallel to the first optical surface,
   the second optical surface including a second pattern formed from second sub-wavelength elements that are sized smaller than the wavelength,
   the first optical surface and the second optical surface including respective phase distributions that are configured to deflect rays along paths of equal optical group length (OGL), and
   the OGL for a path between a first point on the first optical surface and a second point on the second optical surface being defined as a product of a group refractive index of the body and a distance between the first point and the second point, added to a distance between the second point and an image point.

2. The optical element of claim 1, wherein the first pattern and the second pattern are configured such that the at least one body is configured to function as an achromatic beam deflector.

3. The optical element of claim 1, wherein the first pattern and the second pattern are configured such that the at least one body is configured to function as an achromatic doublet metalens.

4. The optical element of claim 1, wherein the first pattern and the second pattern are configured such that the at least one body is configured to function as a triplet chromatic corrector.

5. The optical element of claim 1, wherein the first pattern and the second pattern are configured such that the at least one body is configured to function as a triplet metalens.

6. The optical element of claim 1, wherein the first pattern and the second pattern are configured such that the at least one body is configured to function as a triplet corrector, the triplet corrector being a Type I corrector or a Type II corrector.

7. The optical element of claim 1, wherein the first pattern and the second pattern are configured such that the at least one body is configured to function as a metalens triplet based on a corrector, the corrector being a Type I corrector or a Type II corrector.

8. The optical element of claim 1, wherein the first pattern and the second pattern are configured such that the at least one body is configured to function as a super-dispersive beam deflector.

9. The optical element of claim 1, wherein the first pattern and the second pattern are configured such that the at least one body is configured to function as a beam deflector having positive dispersion.

10. The optical element of claim 1, wherein the first pattern and the second pattern are configured such that the at least one body is configured to function as an afocal triplet.

11. The optical element of claim 1, further comprising a triplet lens, wherein the first pattern and the second pattern are configured such that the at least one body is configured to function as an afocal triplet that increases a dispersion of the triplet lens or changes a sign of a dispersion of the triplet lens.

12. An achromatic lens, comprising:
a first optical surface including a first pattern formed from sub-wavelength elements, the first pattern extending over a first annular area that surrounds a first central location, the first pattern configured to receive an incident beam, the incident beam including light rays that are all parallel to one another, the first optical surface further configured to angularly divert each light ray in the incident beam by a first angular diversion to form a helical internal beam, the first angular diversion varying from ray-to-ray for at least two light rays in the incident beam; and
a second optical surface oriented parallel to the first optical surface, the second optical surface including a second pattern formed from sub-wavelength elements, the second pattern extending over a second annular area that surrounds a second central location, the first and second central locations defining a central axis, the second pattern configured to receive the helical internal beam and angularly divert each light ray in the helical internal beam by a second angular diversion to form an exiting beam, the second angular diversion varying from ray-to-ray for at least two light rays in the helical internal beam such that the all the light rays in the exiting beam are angled to intersect the central axis at a focal point of the achromatic lens.

13. The achromatic lens of claim 12, wherein the first and second optical surfaces are planar.

14. The achromatic lens of claim 13, wherein the light rays in the incident beam are orthogonal to the first optical surface.

15. The achromatic lens of claim 14, wherein:
a first ray is configured to strike the first pattern at a first location that is separated from the central axis by a first distance; and
the first pattern is configured to angularly divert the first ray to strike the second pattern at a second location that is separated from the central axis by the first distance.

16. The achromatic lens of claim 15, wherein the first and second locations are separated by a first azimuthal angle.

17. The achromatic lens of claim 16, wherein:
a second ray is configured to strike the first pattern at a third location that is separated from the central axis by a second distance that is different from the first distance; and
the first pattern is configured to angularly divert the second ray to strike the second pattern at a fourth location that is separated from the central axis by the second distance.

18. The achromatic lens of claim 17, wherein the third and fourth locations are separated by a second azimuthal angle that is different from the first azimuthal angle.

19. The achromatic lens of claim 18, wherein:
the second distance is less than the first distance; and
the second azimuthal angle is greater than the first azimuthal angle.

20. The achromatic lens of claim 12, wherein the incident surface and the exiting surfaces are formed as opposing faces of a transparent optical body.

* * * * *